Dec. 5, 1967　　　D. M. WESTERMAN　　　3,356,017
HAY BALER PRESSURE PLATE EQUALIZER
Filed July 19, 1965　　　2 Sheets-Sheet 1
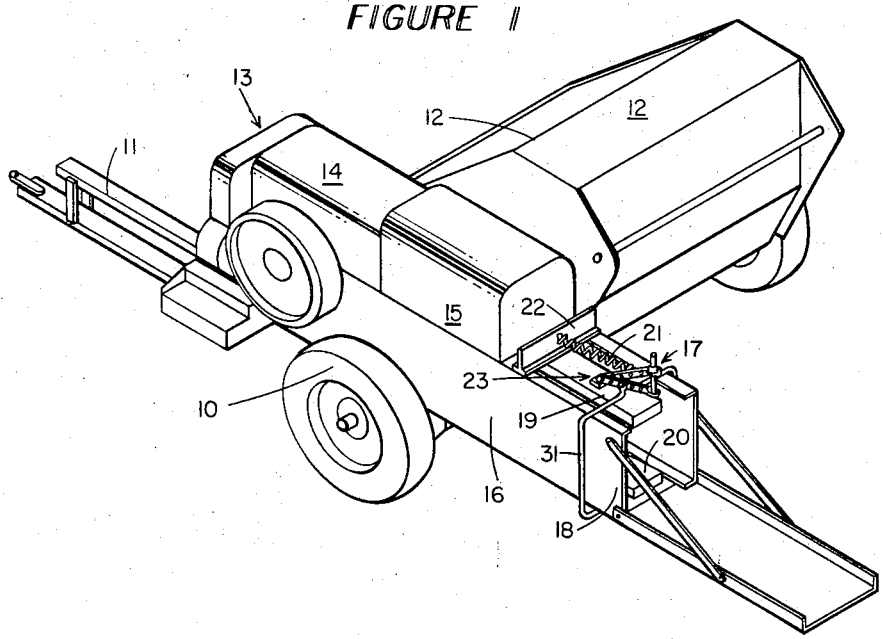
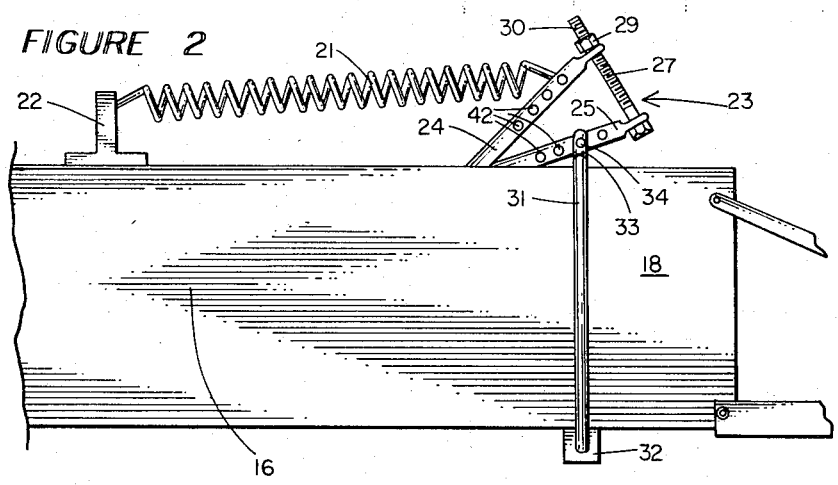
Donald M. Westerman, INVENTOR.
BY
ATTORNEY.

Dec. 5, 1967   D. M. WESTERMAN   3,356,017
HAY BALER PRESSURE PLATE EQUALIZER
Filed July 19, 1965   2 Sheets-Sheet 2
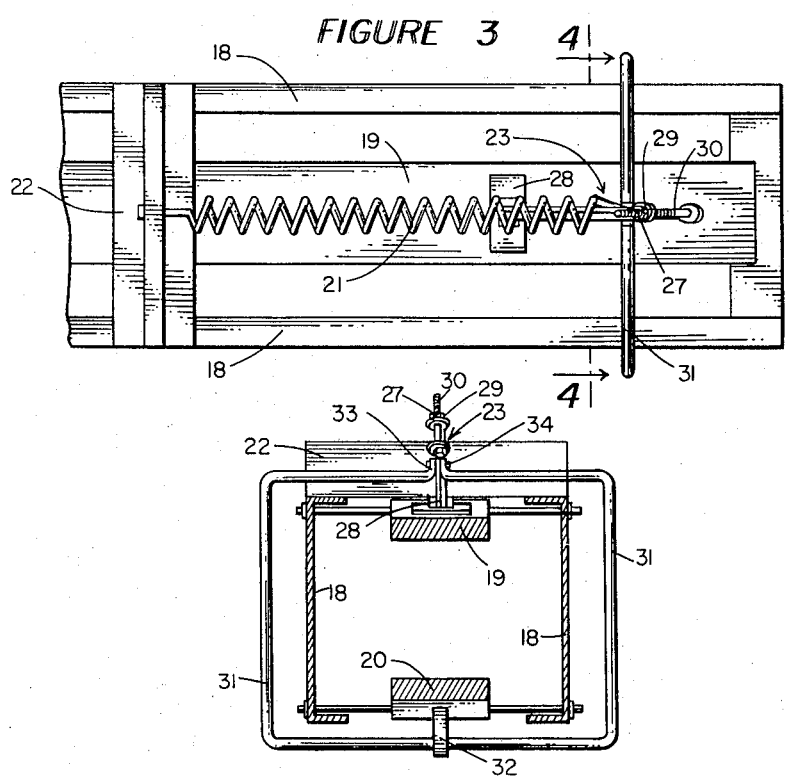
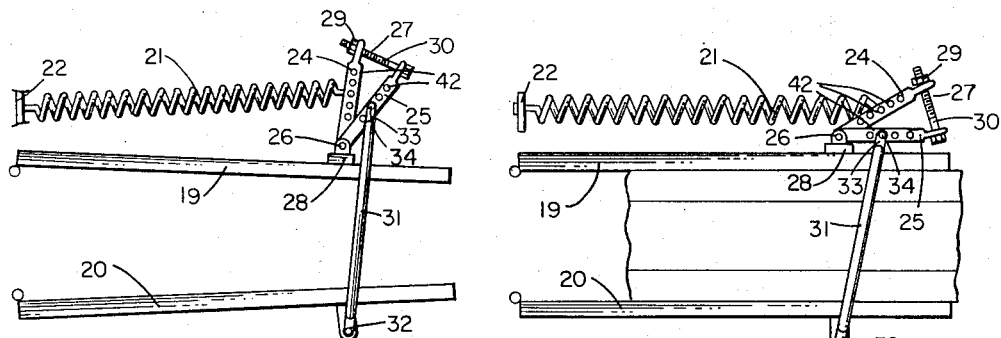
Donald M. Westerman,
INVENTOR.
BY
ATTORNEY.

United States Patent Office 3,356,017
Patented Dec. 5, 1967

3,356,017
HAY BALER PRESSURE PLATE EQUALIZER
Donald M. Westerman, 10122 Broadway,
Spokane, Wash. 99206
Filed July 19, 1965, Ser. No. 473,009
1 Claim. (Cl. 100—192)

ABSTRACT OF THE DISCLOSURE

A bell crank operated tensioning device for a hay baler having opposed pressure plates regulating bale density. The bell crank is mechanically biased to present lessened pressure between the pressure plates upon their extension and greater pressure upon their compression. The pressure-compression function is variable within limits by adjustable positioning of bell crank arms and linkages communicating therewith.

This invention relates generally to a device for equalizing pressure on the paired opposed pressure plates of a hay baler, and more particularly to such a device having a spring biased, lever-linked mechanism which temporarily decreases pressure upon the plates during expansion to allow plugs of hay to be baled without choking the mechanism or creating partial bales.

Though heretofore many types and styles of hay balers have become commercially known, substantially all of the square bale type have depended upon essentially the same system of paired opposed pressure plate system to create compaction in a bale of the desired density. This system includes two opposed pressure plates, generally on the top and bottom parts of the bale channel, positioned therein so that the bale must pass between them. The two sides of the bale may be limited by a similar mechanism or, more commonly, merely by adjustably positionable side walls. The size of the bale channel, limited then principally by the top and bottom pressure plates, in conjunction with the pressure of the baling ram, establishes the density of bales.

Heretofore it has been common to directly link the two pressure plates by means of extension springs so that as the two plates move away from each other the pressure therebetween increases substantially lineally. In most commercial constructions one of the pressure plates is rigidly attached to the baler frame-work and since the vegetative matter comprising the bale is not homogeneous nor equally dense and subjected to relatively great pressures, very oftentimes more pressure, and consequently more friction between bale and pressure plate, will be noted on one side, most generally the immovable one. This tends to form a bale of non-uniform density and oftentimes of mal-shape.

Green hay also has caused problems in existing baler structures. Because of its nature, it is intrinsically more dense, less compressible and of different frictional characteristics than the dry product. Oftentimes when baling hay containing both wet and dry components, the baler will be plugged by a quantity of the wet hay or oftentimes uneven or partial bales will be formed because of this.

With these factors and this background in mind, I have created a new biasing and linkage device for use in conjunction with existing pressure plates of hay balers of commerce of this type that seeks to alleviate many of the problems heretofore existing in connection with such devices. In so doing, it is:

A principal object of my invention to provide a spring biased, bell-crank linkage between the paired, opposed pressure plates of a commercial hay baler to aid in maintaining equal pressure and substantially equal frictional characteristics between the inner surface of each of said pressure plates and the bale therebetween.

It is a further object of my invention to provide a device of the nature aforesaid of an adjustable nature that allows for automatic adjustment for differing pressures through smaller ranges and manual adjustment through larger ranges.

It is a still further object of my invention to provide a device of the nature aforesaid that is automatically adjustable to allow plugs of green hay to be baled without manual adjustment of the pressure equalizing system and without plugging of the machine.

It is a still further object of my invention to provide a device of the nature aforesaid that may be readily installed upon existing hay balers of commerce with only slight modification thereof.

It is a still further object of my invention to provide a device of new and novel design, of simple and economic manufacture and of rugged and durable nature.

Other and further objects of my invention will appear from the following drawings, specification and claims which form a part of this application.

In the accompanying drawings, in which like numbers of reference refer to similar parts throughout:

FIGURE 1 is an isometric view of an ordinary hay baler of commerce showing my invention in place on the bale channel.

FIGURE 2 is an orthographic, partial side view of my invention showing its parts in detail and the configuration and arrangement thereof.

FIGURE 3 is an orthographic, partial top view of the same invention as shown in FIGURE 2.

FIGURE 4 is an orthographic, vertical cross-sectional view, from the rear, of the invention of FIGURE 3, taken on the line 4—4 thereon in the direction indicated by the arrows.

FIGURE 5 is a diagram of my invention showing it in its non-stressed position.

FIGURE 6 is a diagram of the same invention as FIGURE 5, showing the invention in a stressed or extended position.

Referring now to the drawings in greater detail, in FIG. 1 there will be seen a hay baler which is representative of the machines of present day commerce. This machine includes the wheel mounted structural frame 10 communicating with forwardly projecting hitch 11, adapted for locomotion of the machine. Carried upon the rigid frame 10 is pick-up mechanism 12 operatively communicating with baling structure 13, comprising forward piston carrying member 14 communicating with the central product receiving chamber 15, in turn communicating with rearward baling channel 16. My invention, designated generally as 17, is shown in place upon the upper portion of rearward baling channel 16.

In this machine the product to be baled is picked up by pick-up mechanism 12 and transported by it to central product receiving chamber 15, where it is somewhat compacted and transferred to the rearward baling chamber 16 for final compaction and fastening. Rearward baling chamber 16 has similar side members 18 usually rigidly positioned upon the machine frame 10, though not necessarily so. Interposed between side members 18 are upper pressure plate 19 and lower pressure plate 20, with the entire member, or at least the rearward-most portion of it, mounted for movement in a horizontal direction.

As vegetation, or other matter to be baled, is forced into rearward baling chamber 16 between the upper and lower pressure plates 19, 20, compaction of the product, and thusly its density, may be regulated by regulation of the distance between the upper and lower pressure plates, if moveable, and the pressure required to cause movement thereof in a vertical dimension. It is to be noted that this regulation may be had with or without regulation of the pressure of the forward plunger upon the baled product.

This structure is well known in the art and available upon many square-bale baling implements of commerce.

My invention comprises specifically the structure 17 shown generally in FIGURE 1, and in more detail in FIGURES 2 and 3, that links upper and lower pressure plates 19, 20.

This invention comprises the tensioning spring 21, of an extension type, communicating at one end with the cross member 22 structurally attached to the side frame 18 of rearward baling channel 16. The other end of spring 21 communicates to the adjustable bell crank 23, having spring arm 24 and pressure bar arm 25 rotatably joined by pivotal axle bolt 26 and adjustably angularly positioned relative to each other by positioning bolt 27. Both spring arm 24 and pressure bar arm 25 have a series of spaced holes 42 distributed along the axis of each member so that the members communicating therewith may be adjustably positioned relative thereto.

Pivotal axle bolt 26 preferably extends into upper pressure plate housing 28 to rotatably mount bell crank 23 thereon, in the position illustrated.

Positioning bolt 27 adjustably positions the two arms of bell crank 23 in a predetermined angular relationship to each other; this adjustment is accomplished by appropriate movement of nut 29 upon threaded shaft 30 of the positioning bolt.

The U-shaped pressure arm 31 communicates from pressure bar arm 25 of the bell crank outwardly and downwardly on each side to lower pressure plate 20 by means of lower pressure plate housing 32, rotatably joining the members 31, 20. Pressure arm 31 is preferably provided with the similar opposed upturned ears 33 having a central hole adapted to allow passage of bolt 34 therethrough to provide a rotatable juncture between these parts. The pressure arm must be sufficiently rigid to transmit required forces between its rotatable junctures.

With this arrangement of parts as illustrated, it is to be noted that pressure will be distributed equally between both the upper and lower pressure plates 19, 20.

It is to be further noted from the structure recited, that the relative effective length of the moment distance of the spring arm about pivot 26 may be varied in relation to the moment distance of the pressure bar arm, so that either may be greater or lesser than the other, thus allowing the pressure applied to either pressure plate to be varied relative to the movement of the tension spring, allowing a variety of relationships between the members in this regard.

It is to be further noted that the pressure plates may be so joined that they may temporarily expand with less than the spring tension between them if they were directly connected by a tension spring, to allow for the easier passage of a plug of green hay.

While the foregoing description is necessarily of a detailed, particular character so that a specific embodiment of my invention may be clearly set forth as required by law, it is to be understood that various rearrangements of parts, multiplications thereof and modifications of detail may be made in connection with the invention without departing from its spirit, scope or essence.

Having thusly described my invention, what I desire to protect by Letters Patent, and

What I claim is:

In a commercial hay baler of the type having a forward structure and a baling chamber with rearwardly extending baling channel having upper and lower pressure plates carried therein to regulate the density of bales passing therethrough, a spring tensioning means comprising, in combination:

an adjustable bell crank having a spring arm and pressure bar arm pivotally joined and angularly adjustable in relation to each other, each of said arms having a plurality of axially spaced holes at varying radial distances from said pivotal joint, said bell crank positioned so that said pivotally joined part is the forwardmost point thereof;

a housing structurally communicating with the rearward part of the upper pressure plate of said baler pivotally communicating with the said pivotally joined parts of said bell crank;

an elongate tension spring communicating from the forward structure of said baler pivotably to one of the plurality of holes in said spring arm;

a pressure bar pivotally communicating from one of said holes in said pressure bar arm to a housing structurally carried by said lower pressure plate so as to bias said upper and lower pressure plates toward each other in response to tension in said tension spring.

References Cited

UNITED STATES PATENTS

| 1,394,458 | 10/1921 | Whitney | 100—192 X |
| 2,551,464 | 5/1951 | Raney | 100—192 |
| 2,613,590 | 10/1952 | Gray bill | 100—192 X |

FOREIGN PATENTS

| 584,325 | 9/1933 | Germany. |
| 1,028,375 | 4/1958 | Germany. |
| 818,890 | 8/1959 | Great Britain. |
| 560,818 | 4/1957 | Italy. |

LOUIS O. MAASSEL, *Primary Examiner.*